United States Patent
Ning et al.

(10) Patent No.: US 10,843,131 B2
(45) Date of Patent: Nov. 24, 2020

(54) SYSTEM AND METHOD FOR DESULFURIZATION AND DENITRIFICATION INTEGRATED TREATMENT AND RECYCLING OF FLUE GAS BY USING RED MUD

(71) Applicants: KUNMING UNIVERSITY OF SCIENCE AND TECHNOLOGY, Yunnan (CN); PINGXIANG HUAXING ENVIRONMENTAL PROTECTION ENGINEERING TECHNOLOGY CO., LTD., Jiangxi (CN)

(72) Inventors: Ping Ning, Kunming (CN); Liangtao Yin, Kunming (CN); Qiulin Zhang, Kunming (CN); Lijuan Jia, Kunming (CN); Zaifei Yin, Kunming (CN); Bo Li, Pingxiang (CN); Shaoming Li, Pingxiang (CN); Bin Li, Pingxiang (CN)

(73) Assignees: Kunming University of Science and Technology, Kunming (CN); Pingxiang Huaxing Environmental Protection Engineering Technology Co., Ltd., Pingxiang (CN)

( * ) Notice: Subject to any disclaimer, the term of this patent is extended or adjusted under 35 U.S.C. 154(b) by 0 days.

(21) Appl. No.: 16/705,361

(22) Filed: Dec. 6, 2019

(65) Prior Publication Data
US 2020/0179872 A1    Jun. 11, 2020

(30) Foreign Application Priority Data
Dec. 6, 2018  (CN) .......................... 2018 1 1487658

(51) Int. Cl.
*B01D 53/80* (2006.01)
*B01D 53/60* (2006.01)
(Continued)

(52) U.S. Cl.
CPC ............. *B01D 53/80* (2013.01); *B01D 3/009* (2013.01); *B01D 21/01* (2013.01); *B01D 53/60* (2013.01);
(Continued)

(58) Field of Classification Search
CPC .. C02F 3/302; C02F 2101/16; C02F 2103/18; C02F 3/303; C01F 7/066; C01F 11/46;
(Continued)

(56) References Cited

U.S. PATENT DOCUMENTS 4,741,278 A * 5/1988 Franke ...................... C10L 9/10
110/342
10,537,872 B1 * 1/2020 Saha ................... C01B 13/0203
(Continued)

FOREIGN PATENT DOCUMENTS

CN    107961660 A  *  4/2018  ......... Y02A 50/2344
CN    109675425 A  *  4/2019  ............. B01D 53/80
(Continued)

*Primary Examiner* — Timothy C Vanoy
(74) *Attorney, Agent, or Firm* — Alston & Bird LLP

(57) ABSTRACT

The present invention relates to a system and method for desulfurization and denitrification integrated treatment and recycling of flue gas by using red mud, and belongs to the recycling and environmental protection technology field. The system includes a desulfurization spray tower, an ozone generator, a denitration spray tower, a slurry mixing tank, a slurry storage tank, a vacuum filter, an ammonia water neutralization tank, an aluminum hydroxide precipitation tank, an ammonia water tank, an aluminum hydroxide storage tank, a filter press, an ammonia distillation tower, a dephlegmator, a cooler, a concentrated ammonia water stor-
(Continued)

age tank, a gypsum precipitation tank, and an anaerobic biochemical pool. In the present invention, red mud slurry is used for desulfurization and denitrification treatment of flue gas to remove $SO_2$ and NO in the flue gas, so that $SO_2$ and NO in the flue gas reach an emission standard.

8 Claims, 2 Drawing Sheets

(51) Int. Cl.
    *B01D 53/73*      (2006.01)
    *C01F 7/06*      (2006.01)
    *C01F 7/34*      (2006.01)
    *B01D 21/01*      (2006.01)
    *B01D 3/00*      (2006.01)
    *C02F 3/30*      (2006.01)
    *C01F 11/46*      (2006.01)
    *C02F 101/16*      (2006.01)

(52) U.S. Cl.
    CPC .............. *B01D 53/73* (2013.01); *C01F 7/066* (2013.01); *C01F 7/34* (2013.01); *C01F 11/46* (2013.01); *C02F 3/303* (2013.01); *B01D 2251/104* (2013.01); *B01D 2257/302* (2013.01); *B01D 2257/404* (2013.01); *C02F 2101/16* (2013.01)

(58) Field of Classification Search
    CPC ........... C01F 7/34; B01D 53/60; B01D 53/73; B01D 53/80; B01D 3/009; B01D 2251/104; B01D 21/01; B01D 2257/302; B01D 2257/404; B01D 3/145; B01D 2251/002; B01D 53/74; B01J 19/00
    See application file for complete search history.

(56) References Cited

U.S. PATENT DOCUMENTS

2012/0049114 A1*    3/2012    Seeker ............... B01D 53/1418
                                                                                                                                                          252/184
2018/0346380 A1*    12/2018    Nie ..................... C04B 28/006

FOREIGN PATENT DOCUMENTS

| CN | 109939561 A | * | 6/2019 | ............. B01D 53/86 |
|---|---|---|---|---|
| CN | 110052157 A | * | 7/2019 | ............. B01D 53/83 |
| JP | 53113761 A | * | 10/1978 | ............. B01D 53/34 |

* cited by examiner

SYSTEM AND METHOD FOR DESULFURIZATION AND DENITRIFICATION INTEGRATED TREATMENT AND RECYCLING OF FLUE GAS BY USING RED MUD

CROSS-REFERENCE TO RELATED APPLICATIONS

This application claims priority to Chinese Patent Application No. 201811487658.4, filed on Dec. 6, 2018, the entire contents of which are incorporated herein by reference.

TECHNICAL FIELD

The present invention relates to a system and method for desulfurization and denitrification integrated treatment and recycling of flue gas by using red mud, and belongs to the field of recycling and environmental protection.

BACKGROUND

The first step of the modern aluminum industry is to extract pure aluminum oxide from bauxite. Components of the bauxite include $Al_2O_3$, $SiO_2$, $Fe_2O_3$, $TiO_2$, a small quantity of CaO, MgO, and sulfide, and the like. An aluminum oxide production method that has been applied in the industry is an alkaline process. In the method, an alkali (NaOH or $Na_2CO_3$) is used to process bauxite, to allow aluminum oxide in the ore react with the alkali to generate a sodium aluminate solution, and allow iron, titanium, and calcium react with most silica in the ore to generate precipitates such as calcite, hydrate garnet, and calcium silicate aluminum. After soluble aluminum sulfate is separated from the precipitates, a required aluminum sulfate solution is obtained, and aluminum hydroxide can be separated out through decomposition after purification treatment of the aluminum sulfate solution. Discarded precipitates appear red because a large amount of iron oxide is contained, and therefore are referred to as red mud.

In a production process of aluminum oxide in China, an amount of red mud produced every year exceeds 6 million tons; all of them are stacked in the open air; and most of stock dumps and dam bodies are constructed using red mud. With the development of the aluminum industry and the decrease in the grade of bauxite ore, there is an increasing amount of red mud. Besides, the red mud is an alkaline matter, and it easily alkalizes the land and pollutes underground water.

Industrial waste gas contains a large amount of $SO_2$ and NO, which greatly pollutes the air. In the prior art, for both red mud treatment and desulfurization and denitrification treatment of industrial waste gas, a large amount of manpower and material resources need to be consumed. However, at present, there is no system and method for desulfurization and denitrification integrated treatment and recycling of flue gas by using red mud.

SUMMARY

In view of the foregoing problem existing in the prior art, the present invention provides a system and method for desulfurization and denitrification integrated treatment and recycling of flue gas by using red mud. In the present invention, red mud slurry is used for desulfurization and denitrification treatment of flue gas to remove $SO_2$ and NO in the flue gas, so that $SO_2$ and NO in the flue gas reach an emission standard. An ammonia precipitant is used to recycle aluminum hydroxide in the red mud slurry, and after being subject to precipitation and hydration and biochemical treatment, wastewater is returned to be used as blend.

In the present invention, waste-red mud of the aluminum smelting industry is used as a flue gas desulfurizer for treating waste by waste to replace lime desulfurization. Aluminum ions in slurry are converted into aluminum hydroxide, and the aluminum hydroxide can be returned to prepare aluminum oxide, and can also form an aluminum hydroxide product for inorganic flame retardant additives.

The technical solution used in the present invention to resolve the technical problem thereof is as follows:

A system for desulfurization and denitrification integrated treatment and recycling of flue gas by using red mud is provided, including a desulfurization spray tower 2, an ozone generator 4, a denitration spray tower 5, a slurry mixing tank 6, a slurry storage tank 8, a vacuum filter 10, an ammonia water neutralization tank 11, an aluminum hydroxide precipitation tank 12, an ammonia water tank 13, an aluminum hydroxide storage tank 14, a filter press 16, an ammonia distillation tower 18, a dephlegmator 19, a cooler 20, a concentrated ammonia water storage tank 21, a gypsum precipitation tank 22, and an anaerobic biochemical pool 23, where an air blower 1 is arranged at a flue gas inlet end at the bottom of the desulfurization spray tower 2; a liquid outlet end at the bottom of the desulfurization spray tower 2 is communicated with a spray nozzle communication pipeline at the top of the desulfurization spray tower 2 through a circulation pipeline I; a circulating pump 13 is arranged on the circulation pipeline I; a flue gas outlet end at a top end of the desulfurization spray tower 2 is communicated with a flue gas inlet end of the denitration spray tower 5 through a flue gas conveying pipeline I; an ozone outlet end of the ozone generator 4 is communicated with the flue gas conveying pipeline I through an ozone conveying pipeline; a liquid inlet at the bottom of the desulfurization spray tower 2 is communicated with a liquid outlet at the bottom of the denitration spray tower 5 through a slurry pipeline I; a liquid discharge port at the bottom of the desulfurization spray tower 2 is communicated with a liquid inlet of the slurry storage tank 8 through a slurry pipeline II; a liquid outlet of the slurry storage tank 8 is communicated with a liquid inlet of the vacuum filter 10 through a slurry pipeline IV; a slurry pump 9 is arranged on the slurry pipeline IV; a liquid outlet of the vacuum filter 10 is communicated with a liquid inlet of the ammonia water neutralization tank 11 through a liquid conveying pipeline I; a liquid outlet of the ammonia water neutralization tank 11 is communicated with a liquid inlet of the aluminum hydroxide precipitation tank 12 through a liquid conveying pipeline II; a liquid outlet end at the top of the aluminum hydroxide precipitation tank 12 is communicated with a liquid inlet of the ammonia water tank 13 through a liquid conveying pipeline III; a slurry outlet at the bottom of the aluminum hydroxide precipitation tank 12 is communicated with a feed port of the aluminum hydroxide storage tank 14 through an aluminum hydroxide slurry conveying pipeline; the aluminum hydroxide storage tank 14 is communicated with the filter press 16 through a screw filter pump 15; a liquid outlet of the filter press 16 is communicated with a liquid inlet of the ammonia water tank 13 through a liquid conveying pipeline IV; a liquid outlet of the ammonia water tank 13 is communicated with the dephlegmator 19 through a liquid conveying pipeline V; an ammonia pump 17 is arrange on the liquid conveying pipeline V; a liquid outlet of the dephlegmator 19 is communicated with a liquid inlet at the top of the ammonia distillation tower 18 through the slurry pipeline IV; a gas outlet at the top of the ammonia distillation tower 18 is communicated with a gas inlet of the dephlegmator 19 through a flue gas conveying pipeline II; a gas outlet of the dephlegmator 19 is communicated with an air inlet end of the cooler 20 through a flue gas conveying pipeline III; the cooler 20 is communicated with the concentrated ammonia water 21 through a slurry pipeline V; the concentrated ammonia water 21 is communicated with the ammonia water neutralization tank 11 through a slurry pipeline VI; a bottom part of the ammonia distillation tower 18 is communicated with the gypsum precipitation tank 21 through a slurry pipeline VII; an outlet of the gypsum precipitation tank 22 is communicated with the anaerobic biochemical pool 23 through a slurry pipeline VIII; and a slurry outlet of the anaerobic biochemical pool 23 is communicated with a feed end of the slurry mixing tank 6 through a slurry pipeline IX;

a liquid outlet end at the bottom of the denitration spray tower 5 is communicated with a spray nozzle communication pipeline at the top of the denitration spray tower 5 through a circulation pipeline II; a circulating pump II is arranged on the circulation pipeline II; a liquid inlet at the bottom of the denitration spray tower 5 is communicated with a liquid discharge port of the slurry mixing tank 6 through a slurry pipeline III; and a feed pump 7 is arranged on the slurry pipeline III; and each of the circulation pipeline I, the circulation pipeline II, the flue gas conveying pipeline I, the flue gas conveying pipeline II, the flue gas conveying pipeline III, the ozone conveying pipeline, the slurry pipeline I, the slurry pipeline II, the slurry pipeline III, the slurry pipeline IV, the slurry pipeline V, the slurry pipeline VI, the slurry pipeline VII, the slurry pipeline VIII, the slurry pipeline IX, the liquid conveying pipeline I, the liquid conveying pipeline II, the liquid conveying pipeline III, the liquid conveying pipeline IV, the liquid conveying pipeline V, and the aluminum hydroxide slurry conveying pipeline is provided with a valve.

A method for desulfurization and denitrification integrated treatment and recycling of flue gas by using red mud is provided, where the system for desulfurization and denitrification integrated treatment and recycling of flue gas by using red mud is used, and specific steps of the method are as follows:

(1) adding red mud into the slurry mixing tank and conducting slurry mixing on the red mud and backwater obtained through biochemical treatment in the anaerobic biochemical pool to obtain red mud slurry, and adding the red mud slurry into the denitration spray tower through the feed pump on the slurry pipeline III, conveying the red mud slurry to the spray pipeline at a top end of the denitration spray tower through the circulation pump II on the circulation pipeline II, and conveying the red mud slurry to the bottom of the desulfurization spray tower through the slurry pipeline I;

(2) conveying the red mud slurry at the bottom of the desulfurization spray tower to the spray pipeline at a top end of the desulfurization spray tower through the circulation pump I on the circulation pipeline I, introducing flue gas into the desulfurization spray tower through the air blower for conducting gas-liquid countercurrent contact desulfurization treatment with the red mud slurry to obtain desulfurized flue gas and slurry A, conveying the slurry A to the spray pipeline at the top end of the desulfurization spray tower through the circulation pump I on the circulation pipeline I to replace the red mud slurry, and conveying the desulfurized flue gas to the denitration spray tower through the flue gas conveying pipeline I;

(3) conveying ozone generated by the ozone generator to the flue gas conveying pipeline I through the ozone conveying pipeline and allowing the ozone to enter the denitration spray tower along with the desulfurized flue gas, conducting gas-liquid countercurrent contact denitrification treatment on the desulfurized flue gas, the ozone, and the red mud slurry to obtain desulfurized and denitrified flue gas and slurry B, conveying the slurry B to the spray pipeline at a top end of the denitration spray tower through the circulation pump II on the circulation pipeline II to replace the red mud slurry, conveying the slurry B to the bottom of the desulfurization spray tower through the slurry pipeline I to replace the red mud slurry, and emptying the desulfurized and denitrified flue gas;

(4) adding the slurry A obtained through circulation treatment in step (2) into the slurry storage tank through the slurry pipeline II, conveying the slurry in the slurry storage tank to the vacuum filter through the slurry pump on the slurry pipeline IV for solid-liquid separation, allowing liquid to enter the ammonia water neutralization tank through the liquid conveying pipeline I for conducting a neutralization reaction with ammonium water until slurry becomes neutral, allowing the slurry obtained after the reaction to enter the aluminum hydroxide precipitation tank through the liquid conveying pipeline II, adding a flocculant for sedimentation treatment to obtain underlayer aluminum hydroxide slurry and liquid supernatant, allowing the liquid supernatant to enter the ammonia water tank through the liquid conveying pipeline III, conveying the underlayer aluminum hydroxide slurry to the aluminum hydroxide storage tank through the aluminum hydroxide slurry conveying pipeline, conveying the aluminum hydroxide slurry in the aluminum hydroxide storage tank to the filter press through the screw filter pump for filter pressing to obtain alumina hydrate and filtrate, and conveying the filtrate to the ammonia water tank through the liquid conveying pipeline IV; and (5) conveying slurry in the ammonia water tank to the dephlegmator through the ammonia pump on the liquid conveying pipeline V for heat exchange, adding the slurry to the ammonia distillation tower through the slurry pipeline IV for conducting a reaction with lime milk and vapor to obtain ammonia vapor and ammonia distillation wastewater, conveying the ammonia vapor to the dephlegmator through the flue gas conveying pipeline II for heat exchange to obtain concentrated ammonia gas, conveying the concentrated ammonia gas to the cooler through the flue gas conveying pipeline III for cooling treatment to obtain concentrated ammonia water, conveying the concentrated ammonia water to the concentrated ammonia water storage tank through the slurry pipeline V, conveying the concentrated ammonia water in the concentrated ammonia water storage tank to the ammonia water neutralization tank through the slurry pipeline VI for conducting an ammonia water neutralization reaction, conveying the ammonia distillation wastewater to the gypsum precipitation tank through the slurry pipeline VII for precipitation to obtain hydrated gypsum and supernatant wastewater, conveying the supernatant wastewater to the anaerobic biochemical pool through the slurry pipeline VIII for anaerobic nitrification treatment to obtain purified water and nitrogen gas, and conveying the purified water to the slurry mixing tank through slurry pipeline IX for slurry mixing.

Solid-containing content of the red mud slurry in step (1) is 13 to 15 wt. %, and a pH value of the red mud slurry is 5 to 5.5.

A liquid-gas volume ratio L:m³ of the red mud slurry to the flue gas in the desulfurization spray tower in step (2) is (15-20):1.

A volume ratio of $O_3$ to NO in the denitration spray tower in step (3) is 1:1, and a liquid-gas volume ratio L:m³ of the red mud slurry to the desulfurized flue gas is (15-20):1.

A pH value of a system in the ammonia water neutralization tank in step (4) is 7 to 7.5.

Ammonia vapor temperature at a gas outlet of the dephlegmator is 94 to 96° C., and mass percent content of ammonia in concentrated ammonia water is 8 to 10%.

Principles of the present invention are as follows:

Flue gas desulfurization:

1. Reaction of $SO_2$ and $O_2$ in flue gas with calcite $$CaCO_3+SO_2+0.5O_2+2H_2O \rightarrow CaSO_4 \cdot 2H_2O+CO_2 \quad (1.1)$$

2. Reaction of hydrate garnet ($3CaO \cdot Al_2O_3 \cdot SiO_2 \cdot 4H_2O$) with $SO_2$ in flue gas $SO_2$ is easily soluble in water. $SiO_2$ in the flue gas is in contact with red mud slurry. $SO_2$ is dissolved in water to produce sulfurous acid ($H_2SO_3$) that has very high acidity. Hydrate garnet can be regarded as a silicate of CaO and $Al_2O_3$ substantially, and the silicate is unstable, and silicic acid is separated out when the silicate is in contact with an acid.

$3CaO \cdot Al_2O_3 SiO_2 \cdot 4H_2O$ is separated as silicic acid in an acidic condition, and the reaction is as follows:

$$3CaO \cdot Al_2O_3 \cdot SiO_2 \cdot 4H_2O = 3CaO \cdot Al_2O_3+H_4SiO_4+2H_2O \quad (1.2)$$

The silicic acid is generated in the reaction, and in this case, aluminum sulfate has been generated. The aluminum sulfate is an electrolyte, and colloid has been destroyed. When pH is reduced to 5.5, silicic acid gel forms $SiO_2 \cdot 2H_2O$ precipitate.

At the same time, $SO_2$ and $O_2$ in the flue gas react with $3CaO \cdot Al_2O_3$ to generate gypsum and aluminum sulfate, and the reaction is as follows:

$$2CaO+CaO \cdot Al_2O_3+6SO_2+3O_2+6H_2O = 3CaSO_4 \cdot 2H_2O \downarrow + Al_2(SO_4)_3 \quad (1.3)$$

3. Reaction of aluminum calcium silicate ($CaO \cdot Al_2O_3 \cdot 2SiO_2$) with $SO_2$ in the flue gas The reaction in which the aluminum calcium silicate ($CaO \cdot Al_2O_3 \cdot 2SiO_2$) reacts with $SO_2$ in the flue gas is the same as that of the hydrate garnet, that is, silicic acid is separated out when the aluminum calcium silicate is in contact with an acid, and the reaction is as follows:

$$(CaO \cdot Al_2O_3 \cdot 2SiO_2)+2H_2O = CaO \cdot Al_2O_3+2H_2SiO_3 \quad (1.4)$$

At the same time, $SO_2$ and $O_2$ in the flue gas react with $CaO \cdot Al_2O_3$ to generate dihydrate gypsum and aluminum sulfate, and the reaction is as follows:

$$CaO \cdot Al_2O_3+4SO_2+2O_2+2H_2O = CaSO_4 \cdot 2H_2O \downarrow + Al_2(SO_4)_3 \quad (1.5)$$

4. Reaction of $Na_2O+K_2O$ with $SO_2$ and $O_2$ in the flue gas $Na_2O+K_2O$ react with $SO_2$ and $O_2$ in the flue gas to generate sodium sulfate, and the reaction is as follows:

$$Na_2O+SO_2+0.5O_2 = Na_2SO_4 \quad (1.6)$$

Flue gas denitration:

1. Ozone is used to oxidize NO in the flue gas to $NO_2$;
2. $NO_2$ in the flue gas is dissolved in water to generate nitric acid and nitrous acid;

3. The nitric acid and nitrous acid react with calcite to generate calcium nitrate and calcium nitrite:

$$CaCO_3+2HNO_3 \rightarrow Ca(NO_3)_2+H_2O \quad (2.1)$$

$$CaCO_3+2HNO_2 \rightarrow Ca(NO_2)_2+H_2O \quad (2.2)$$

4. Hydrate garnet ($3CaO \cdot Al_2O_3 \cdot SiO_2 \cdot 4H_2O$) reacts with the nitric acid and nitrous acid.

$$3CaO \cdot Al_2O_3 SiO_2 \cdot 4H_2O+12HNO_3 = 3Ca(NO_3)_2+2Al(NO_3)_3+H_4SiO_4+8H_2O \quad (2.3)$$

$$3CaO \cdot Al_2O_3 \cdot SiO_2 \cdot 4H_2O+12HNO_2 = 3Ca(NO_2)_2+2Al(NO_2)_3+H_4SiO_4+8H_2O \quad (2.4)$$

Slurry treatment:

Discharged slurry is filtered, filter residue is returned to a stock dump, and filtrate is recycled for aluminum treatment.

Ammonia water is used as a precipitant to precipitate aluminum sulfate in a form of aluminum hydroxide; and the reaction is as follows:

$$Al_2(SO_4)_3+3NH_4OH \rightarrow 2Al(OH)_3 \uparrow +3(NH_4)_2SO_4 \quad (3.1)$$

$$Al(NO_3)_3+3NH_4OH \rightarrow Al(OH)_3 \uparrow +3NH_4NO_3 \quad (3.2)$$

$$Al(NO_2)_3+3NH_4OH \rightarrow Al(OH)_3 \uparrow +3NH_4NO_2 \quad (3.3)$$

Neutralization solution is filtered to obtain aluminum hydroxide; and the aluminum hydroxide is returned for being calcined to generate aluminum oxide for sell, or is directly sold.

Each of ammonium sulfate, ammonium nitrate, and ammonium nitrite generated in the slurry has a relatively low concentration, lime is added for neutralization; ammonia gas is evaporated through heating to return to be used as a precipitant; ammonia gas is recycled as an intermediate product; and the reaction is as follows:

$$(NH_4)_2SO_4+Ca(OH)_2+H_2O = CaSO_4 \cdot 2H_2O \downarrow + NH_3 \uparrow \quad (3.4)$$

$$2NH_4NO_3+Ca(OH)_2 = Ca(NO_3)_2+NH_3 \uparrow +H_2O \quad (3.5)$$

$$2NH_4NO_2+Ca(OH)_2 = Ca(NO_2)_2+NH_3 \uparrow +H_2O \quad (3.6)$$

Generated gypsum is filtered, is subjected to anaerobic biochemical treatment, and is returned for use.

Advantageous effects of the present invention are as follows:

(1) In the present invention, red mud slurry is used for desulfurization and denitrification treatment of flue gas to remove $SO_2$ and NO in the flue gas, so that $SO_2$ and NO in the flue gas reach an emission standard. An ammonia precipitant is used to recycle aluminum hydroxide in the red mud slurry, and after being subject to precipitation and hydration and biochemical treatment, wastewater is returned to be used as blend.

(2) In the present invention, waste is treated by using waste, and purification treatment and recycling of environmental pollutants can be implemented.

1—Air blower, 2—desulfurization spray tower, 3—circulating pump I, 4—ozone generator, 5—denitration spray tower, 6—slurry mixing tank, 7—feed pump, 8—slurry storage tank, 9—slurry pump, 10—vacuum filter, 11—ammonia water neutralization tank, 12—aluminum hydroxide precipitation tank, 13—ammonia water tank, 14—aluminum hydroxide storage tank, 15—screw filter pump, 16—filter press, 17—ammonia pump, 18—ammonia distillation tower, 19—dephlegmator, 20—cooler, 21—concentrated ammonia water storage tank, 22—gypsum precipitation tank, and 23—anaerobic biochemical pool.

DETAILED DESCRIPTION

The present invention is further described below with reference to specific implementations.

Embodiment 1

Figure 1:
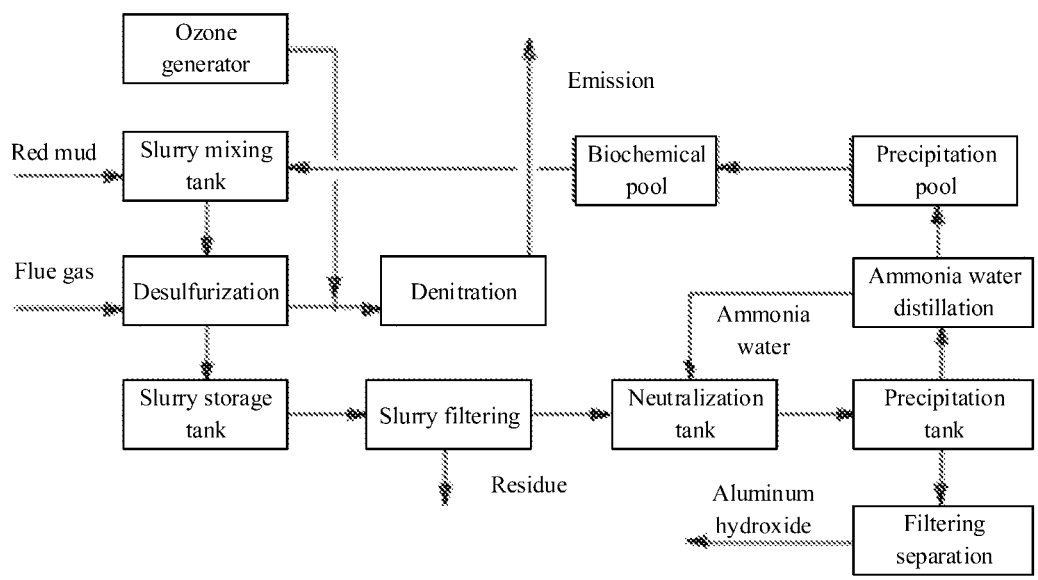
FIG. 1 is a flowchart of a technology for desulfurization and denitrification integrated treatment and recycling of flue gas by using red mud.

As shown in FIG. 1, a system for desulfurization and denitrification integrated treatment and recycling of flue gas by using red mud is provided, including a desulfurization spray tower 2, an ozone generator 4, a denitration spray tower 5, a slurry mixing tank 6, a slurry storage tank 8, a vacuum filter 10, an ammonia water neutralization tank 11, an aluminum hydroxide precipitation tank 12, an ammonia water tank 13, an aluminum hydroxide storage tank 14, a filter press 16, an ammonia distillation tower 18, a dephlegmator 19, a cooler 20, a concentrated ammonia water storage tank 21, a gypsum precipitation tank 22, and an anaerobic biochemical pool 23, where an air blower 1 is arranged at a flue gas inlet end at the bottom of the desulfurization spray tower 2; a liquid outlet end at the bottom of the desulfurization spray tower 2 is communicated with a spray nozzle communication pipeline at the top of the desulfurization spray tower 2 through a circulation pipeline I; a circulating pump 13 is arranged on the circulation pipeline I; a flue gas outlet end at a top end of the desulfurization spray tower 2 is communicated with a flue gas inlet end of the denitration spray tower 5 through a flue gas conveying pipeline I; an ozone outlet end of the ozone generator 4 is communicated with the flue gas conveying pipeline I through an ozone conveying pipeline; a liquid inlet at the bottom of the desulfurization spray tower 2 is communicated with a liquid outlet at the bottom of the denitration spray tower 5 through a slurry pipeline I; a liquid discharge port at the bottom of the desulfurization spray tower 2 is communicated with a liquid inlet of the slurry storage tank 8 through a slurry pipeline II; a liquid outlet of the slurry storage tank 8 is communicated with a liquid inlet of the vacuum filter 10 through a slurry pipeline IV; a slurry pump 9 is arranged on the slurry pipeline IV; a liquid outlet of the vacuum filter 10 is communicated with a liquid inlet of the ammonia water neutralization tank 11 through a liquid conveying pipeline I; a liquid outlet of the ammonia water neutralization tank 11 is communicated with a liquid inlet of the aluminum hydroxide precipitation tank 12 through a liquid conveying pipeline II; a liquid outlet end at the top of the aluminum hydroxide precipitation tank 12 is communicated with a liquid inlet of the ammonia water tank 13 through a liquid conveying pipeline III; a slurry outlet at the bottom of the aluminum hydroxide precipitation tank 12 is communicated with a feed port of the aluminum hydroxide storage tank 14 through an aluminum hydroxide slurry conveying pipeline; the aluminum hydroxide storage tank 14 is communicated with the filter press 16 through a screw filter pump 15; a liquid outlet of the filter press 16 is communicated with a liquid inlet of the ammonia water tank 13 through a liquid conveying pipeline IV; a liquid outlet of the ammonia water tank 13 is communicated with the dephlegmator 19 through a liquid conveying pipeline V; an ammonia pump 17 is arrange on the liquid conveying pipeline V; a liquid outlet of the dephlegmator 19 is communicated with a liquid inlet at the top of the ammonia distillation tower 18 through the slurry pipeline IV; a gas outlet at the top of the ammonia distillation tower 18 is communicated with a gas inlet of the dephlegmator 19 through a flue gas conveying pipeline II; a gas outlet of the dephlegmator 19 is communicated with an air inlet end of the cooler 20 through a flue gas conveying pipeline III; the cooler 20 is communicated with the concentrated ammonia water 21 through a slurry pipeline V; the concentrated ammonia water 21 is communicated with the ammonia water neutralization tank 11 through a slurry pipeline VI; a bottom part of the ammonia distillation tower 18 is communicated with the gypsum precipitation tank 21 through a slurry pipeline VII; an outlet of the gypsum precipitation tank 22 is communicated with the anaerobic biochemical pool 23 through a slurry pipeline VIII; and a slurry outlet of the anaerobic biochemical pool 23 is communicated with a feed end of the slurry mixing tank 6 through a slurry pipeline IX;

a liquid outlet end at the bottom of the denitration spray tower 5 is communicated with a spray nozzle communication pipeline at the top of the denitration spray tower 5 through a circulation pipeline II; a circulating pump II is arranged on the circulation pipeline II; a liquid inlet at the bottom of the denitration spray tower 5 is communicated with a liquid discharge port of the slurry mixing tank 6 through a slurry pipeline III; and a feed pump 7 is arranged on the slurry pipeline III; and each of the circulation pipeline I, the circulation pipeline II, the flue gas conveying pipeline I, the flue gas conveying pipeline II, the flue gas conveying pipeline III, the ozone conveying pipeline, the slurry pipeline I, the slurry pipeline II, the slurry pipeline III, the slurry pipeline IV, the slurry pipeline V, the slurry pipeline VI, the slurry pipeline VII, the slurry pipeline VIII, the slurry pipeline IX, the liquid conveying pipeline I, the liquid conveying pipeline II, the liquid conveying pipeline III, the liquid conveying pipeline IV, the liquid conveying pipeline V, and the aluminum hydroxide slurry conveying pipeline is provided with a valve.

Figure 2:
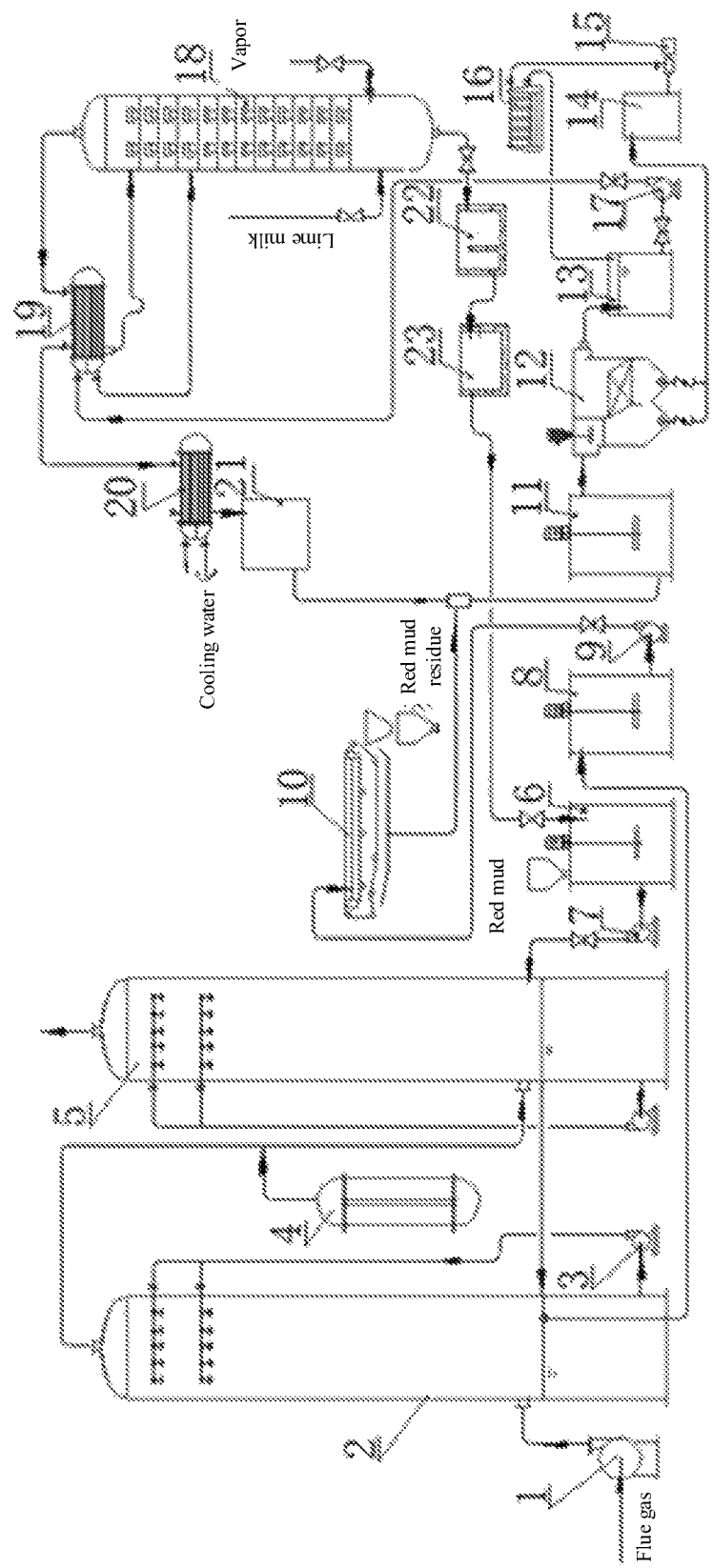
FIG. 2 is a schematic structural diagram of a system for desulfurization and denitrification integrated treatment and recycling of flue gas by using red mud.

As shown in FIG. 1 and FIG. 2, a method for desulfurization and denitrification integrated treatment and recycling of flue gas by using red mud is provided, where the system for desulfurization and denitrification integrated treatment and recycling of flue gas by using red mud is used, and specific steps of the method are as follows:

(1) adding red mud into the slurry mixing tank and conducting slurry mixing on the red mud and backwater obtained through biochemical treatment in the anaerobic biochemical pool to obtain red mud slurry, and adding the red mud slurry into the denitration spray tower through the feed pump on the slurry pipeline III, conveying the red mud slurry to the spray pipeline at a top end of the denitration spray tower through the circulation pump II on the circulation pipeline II, and conveying the red mud slurry to the bottom of the desulfurization spray tower through the slurry pipeline I;

(2) conveying the red mud slurry at the bottom of the desulfurization spray tower to the spray pipeline at a top end of the desulfurization spray tower through the circulation pump I on the circulation pipeline I, introducing flue gas into the desulfurization spray tower through the air blower for conducting gas-liquid countercurrent contact desulfurization treatment with the red mud slurry to obtain desulfurized flue gas and slurry A, conveying the slurry A to the spray pipeline at the top end of the desulfurization spray tower through the circulation pump I on the circulation pipeline I to replace the red mud slurry, and conveying the desulfurized flue gas to the denitration spray tower through the flue gas conveying pipeline I;

(3) conveying ozone generated by the ozone generator to the flue gas conveying pipeline I through the ozone conveying pipeline and allowing the ozone to enter the denitration spray tower along with the desulfurized flue gas, conducting gas-liquid countercurrent contact denitrification treatment on the desulfurized flue gas, the ozone, and the red mud slurry to obtain desulfurized and denitrified flue gas and slurry B, conveying the slurry B to the spray pipeline at a top end of the denitration spray tower through the circulation pump II on the circulation pipeline II to replace the red mud slurry, conveying the slurry B to the bottom of the desulfurization spray tower through the slurry pipeline I to replace the red mud slurry, and emptying the desulfurized and denitrified flue gas;

(4) adding the slurry A obtained through circulation treatment in step (2) into the slurry storage tank through the slurry pipeline II, conveying the slurry in the slurry storage tank to the vacuum filter through the slurry pump on the slurry pipeline IV for solid-liquid separation, allowing liquid to enter the ammonia water neutralization tank through the liquid conveying pipeline I for conducting a neutralization reaction with ammonium water until slurry becomes neutral, allowing the slurry obtained after the reaction to enter the aluminum hydroxide precipitation tank through the liquid conveying pipeline II, adding a flocculant for sedimentation treatment to obtain underlayer aluminum hydroxide slurry and liquid supernatant, allowing the liquid supernatant to enter the ammonia water tank through the liquid conveying pipeline III, conveying the underlayer aluminum hydroxide slurry to the aluminum hydroxide storage tank through the aluminum hydroxide slurry conveying pipeline, conveying the aluminum hydroxide slurry in the aluminum hydroxide storage tank to the filter press through the screw filter pump for filter pressing to obtain alumina hydrate and filtrate, and conveying the filtrate to the ammonia water tank through the liquid conveying pipeline IV; and (5) conveying slurry in the ammonia water tank to the dephlegmator through the ammonia pump on the liquid conveying pipeline V for heat exchange, adding the slurry to the ammonia distillation tower through the slurry pipeline IV for conducting a reaction with lime milk and vapor to obtain ammonia vapor and ammonia distillation wastewater, conveying the ammonia vapor to the dephlegmator through the flue gas conveying pipeline II for heat exchange to obtain concentrated ammonia gas, conveying the concentrated ammonia gas to the cooler through the flue gas conveying pipeline III for cooling treatment to obtain concentrated ammonia water, conveying the concentrated ammonia water to the concentrated ammonia water storage tank through the slurry pipeline V, conveying the concentrated ammonia water in the concentrated ammonia water storage tank to the ammonia water neutralization tank through the slurry pipeline VI for conducting an ammonia water neutralization reaction, conveying the ammonia distillation wastewater to the gypsum precipitation tank through the slurry pipeline VII for precipitation to obtain hydrated gypsum and supernatant wastewater, conveying the supernatant wastewater to the anaerobic biochemical pool through the slurry pipeline VIII for anaerobic nitrification treatment to obtain purified water and nitrogen gas, and conveying the purified water to the slurry mixing tank through slurry pipeline IX for slurry mixing.

Embodiment 2

Flue gas in this embodiment is copper refining flue gas, the flue gas contains 800 mg/m$^3$ of $SO_2$ and 350 mg/m$^3$ of NO; and components of red mud are shown in Table 1:

TABLE 1

| Main phase components of Bayer process red mud | | | | | | | |
|---|---|---|---|---|---|---|---|
| $Al_2O_3$ | $SiO_2$ | $Fe_2O_3$ | $Na_2O$ | CaO | A/S | Ca/S | Na/S |
| 20.41 | 17.17 | 16.92 | 6.18 | 19.1 | 1.44 | 1.47 | 0.36 |

A method for desulfurization and denitrification integrated treatment and recycling of flue gas by using red mud is provided, where the system for desulfurization and denitrification integrated treatment and recycling of flue gas by using red mud in Embodiment 1 is used, and specific steps of the method are as follows:

(1) adding red mud into the slurry mixing tank and conducting slurry mixing on the red mud and backwater obtained through biochemical treatment in the anaerobic biochemical pool to obtain red mud slurry, where solid-containing content of the red mud slurry is 13 to 15 wt. %, and a pH value of the red mud slurry is 5 to 5.5, and adding the red mud slurry into the denitration spray tower through the feed pump on the slurry pipeline III, where a supplement quantity of the red mud slurry in the denitration spray tower is 0.1 m$^3$/h, conveying the red mud slurry to the spray pipeline at a top end of the denitration spray tower through the circulation pump II on the circulation pipeline II, and conveying the red mud slurry to the bottom of the desulfurization spray tower through the slurry pipeline I;

(2) conveying the red mud slurry at the bottom of the desulfurization spray tower to the spray pipeline at a top end of the desulfurization spray tower through the circulation pump I on the circulation pipeline I, introducing flue gas into the desulfurization spray tower through the air blower for conducting gas-liquid countercurrent contact desulfurization treatment with the red mud slurry to obtain desulfurized flue gas and slurry A, conveying the slurry A to the spray pipeline at the top end of the desulfurization spray tower through the circulation pump I on the circulation pipeline I to replace the red mud slurry, and conveying the desulfurized flue gas to the denitration spray tower through the flue gas conveying pipeline I, where a liquid-gas volume ratio L:m$^3$ of the red mud slurry to the flue gas in the desulfurization spray tower is 13.5:1, an amount of flue gas of the desulfurization spray tower is 1500 m$^3$/h; and a circulation volume of the slurry A is 20 m$^3$/h;

(3) conveying ozone generated by the ozone generator to the flue gas conveying pipeline I through the ozone conveying pipeline and allowing the ozone to enter the denitration spray tower along with the desulfurized flue gas, conducting gas-liquid countercurrent contact denitrification treatment on the desulfurized flue gas, the ozone, and the red mud slurry to obtain desulfurized and denitrified flue gas and slurry B, conveying the slurry B to the spray pipeline at a top end of the denitration spray tower through the circulation pump II on the circulation pipeline II to replace the red mud slurry, conveying the slurry B to the bottom of the desulfurization spray tower through the slurry pipeline I to replace the red mud slurry, and emptying the desulfurized and denitrified flue gas, where a volume ratio of $O_3$ to NO in the denitration spray tower is 1:1, a liquid-gas volume ratio $L:m^3$ of the red mud slurry to the desulfurized flue gas is 13.5:1, and a circulation volume of the slurry B is 20 $m^3/h$;

(4) adding the slurry A obtained through circulation treatment in step (2) into the slurry storage tank through the slurry pipeline II, conveying the slurry in the slurry storage tank to the vacuum filter through the slurry pump on the slurry pipeline IV for solid-liquid separation, allowing liquid to enter the ammonia water neutralization tank through the liquid conveying pipeline I for conducting a neutralization reaction with ammonium water until slurry becomes neutral, allowing the slurry obtained after the reaction to enter the aluminum hydroxide precipitation tank through the liquid conveying pipeline II, adding a flocculant for sedimentation treatment to obtain underlayer aluminum hydroxide slurry and liquid supernatant, allowing the liquid supernatant to enter the ammonia water tank through the liquid conveying pipeline III, conveying the underlayer aluminum hydroxide slurry to the aluminum hydroxide storage tank through the aluminum hydroxide slurry conveying pipeline, conveying the aluminum hydroxide slurry in the aluminum hydroxide storage tank to the filter press through the screw filter pump for filter pressing to obtain alumina hydrate and filtrate, and conveying the filtrate to the ammonia water tank through the liquid conveying pipeline IV, where a pH value of a system in the ammonia water neutralization tank is 7 to 7.5; and (5) conveying slurry in the ammonia water tank to the dephlegmator through the ammonia pump on the liquid conveying pipeline V for heat exchange, adding the slurry to the ammonia distillation tower through the slurry pipeline IV for conducting a reaction with lime milk and vapor to obtain ammonia vapor and ammonia distillation wastewater, conveying the ammonia vapor to the dephlegmator through the flue gas conveying pipeline II for heat exchange to obtain concentrated ammonia gas, conveying the concentrated ammonia gas to the cooler through the flue gas conveying pipeline III for cooling treatment to obtain concentrated ammonia water, conveying the concentrated ammonia water to the concentrated ammonia water storage tank through the slurry pipeline V, conveying the concentrated ammonia water in the concentrated ammonia water storage tank to the ammonia water neutralization tank through the slurry pipeline VI for conducting an ammonia water neutralization reaction, conveying the ammonia distillation wastewater to the gypsum precipitation tank through the slurry pipeline VII for precipitation to obtain hydrated gypsum and supernatant wastewater, conveying the supernatant wastewater to the anaerobic biochemical pool through the slurry pipeline VIII for anaerobic nitrification treatment to obtain purified water and nitrogen gas, and conveying the purified water to the slurry mixing tank through slurry pipeline IX for slurry mixing, where ammonia vapor temperature at a gas outlet of the dephlegmator is 94 to 96° C., and mass percent content of ammonia in concentrated ammonia water is 8 to 10%.

In this embodiment, the desulfurized and denitrified flue gas contains 800 $mg/m^3$ of $SO_2$ and 350 $mg/m^3$ of NO. Counted based on the slurry in the slurry storage tank, 0.1 kg alumina hydrate (dry basis) can be obtained from per kilogram of the slurry.

Embodiment 3

Flue gas in this embodiment is copper refining flue gas, and the flue gas contains 3000 $mg/m^3$ of $SO_2$ and 450 $mg/m^3$ of NO.

Components of red mud are the same to those in Table 1.

A method for desulfurization and denitrification integrated treatment and recycling of flue gas by using red mud is provided, where the system for desulfurization and denitrification integrated treatment and recycling of flue gas by using red mud in Embodiment 1 is used, and specific steps of the method are as follows:

(1) adding red mud into the slurry mixing tank and conducting slurry mixing on the red mud and backwater obtained through biochemical treatment in the anaerobic biochemical pool to obtain red mud slurry, where solid-containing content of the red mud slurry is 13 to 15 wt. %, and a pH value of the red mud slurry is 5 to 5.5, and adding the red mud slurry into the denitration spray tower through the feed pump on the slurry pipeline III, where a supplement quantity of the red mud slurry in the denitration spray tower is 14 to 15 $m^3/h$, conveying the red mud slurry to the spray pipeline at a top end of the denitration spray tower through the circulation pump II on the circulation pipeline II, and conveying the red mud slurry to the bottom of the desulfurization spray tower through the slurry pipeline I;

(2) conveying the red mud slurry at the bottom of the desulfurization spray tower to the spray pipeline at a top end of the desulfurization spray tower through the circulation pump I on the circulation pipeline I, introducing flue gas into the desulfurization spray tower through the air blower for conducting gas-liquid countercurrent contact desulfurization treatment with the red mud slurry to obtain desulfurized flue gas and slurry A, conveying the slurry A to the spray pipeline at the top end of the desulfurization spray tower through the circulation pump I on the circulation pipeline I to replace the red mud slurry, and conveying the desulfurized flue gas to the denitration spray tower through the flue gas conveying pipeline I, where a liquid-gas volume ratio $L:m^3$ of the red mud slurry to the flue gas in the desulfurization spray tower is (11-13):1, an amount of flue gas of the desulfurization spray tower is 70000 $m^3/h$; and a circulation volume of the slurry A is 800 to 900 $m^3/h$;

(3) conveying ozone generated by the ozone generator to the flue gas conveying pipeline I through the ozone conveying pipeline and allowing the ozone to enter the denitration spray tower along with the desulfurized flue gas, conducting gas-liquid countercurrent contact denitrification treatment on the desulfurized flue gas, the ozone, and the red mud slurry to obtain desulfurized and denitrified flue gas and slurry B, conveying the slurry B to the spray pipeline at a top end of the denitration spray tower through the circulation pump II on the circulation pipeline II to replace the red mud slurry, conveying the slurry B to the bottom of the desulfurization spray tower through the slurry pipeline I to replace the red mud slurry, and emptying the desulfurized and denitrified flue gas, where a volume ratio of 03 to NO in the denitration spray tower is 1:1, a liquid-gas volume ratio $L:m^3$ of the red mud slurry to the desulfurized flue gas is (11-13):1, and a circulation volume of the slurry B is 800 to 900 $m^3/h$;

(4) adding the slurry A obtained through circulation treatment in step (2) into the slurry storage tank through the slurry pipeline II, conveying the slurry in the slurry storage tank to the vacuum filter through the slurry pump on the slurry pipeline IV for solid-liquid separation, allowing liquid to enter the ammonia water neutralization tank through the liquid conveying pipeline I for conducting a neutralization reaction with ammonium water until slurry becomes neutral, allowing the slurry obtained after the reaction to enter the aluminum hydroxide precipitation tank through the liquid conveying pipeline II, adding a flocculant for sedimentation treatment to obtain underlayer aluminum hydroxide slurry and liquid supernatant, allowing the liquid supernatant to enter the ammonia water tank through the liquid conveying pipeline III, conveying the underlayer aluminum hydroxide slurry to the aluminum hydroxide storage tank through the aluminum hydroxide slurry conveying pipeline, conveying the aluminum hydroxide slurry in the aluminum hydroxide storage tank to the filter press through the screw filter pump for filter pressing to obtain alumina hydrate and filtrate, and conveying the filtrate to the ammonia water tank through the liquid conveying pipeline IV, where a pH value of a system in the ammonia water neutralization tank is 7 to 7.5; and (5) conveying slurry in the ammonia water tank to the dephlegmator through the ammonia pump on the liquid conveying pipeline V for heat exchange, adding the slurry to the ammonia distillation tower through the slurry pipeline IV for conducting a reaction with lime milk and vapor to obtain ammonia vapor and ammonia distillation wastewater, conveying the ammonia vapor to the dephlegmator through the flue gas conveying pipeline II for heat exchange to obtain concentrated ammonia gas, conveying the concentrated ammonia gas to the cooler through the flue gas conveying pipeline III for cooling treatment to obtain concentrated ammonia water, conveying the concentrated ammonia water to the concentrated ammonia water storage tank through the slurry pipeline V, conveying the concentrated ammonia water in the concentrated ammonia water storage tank to the ammonia water neutralization tank through the slurry pipeline VI for conducting an ammonia water neutralization reaction, conveying the ammonia distillation wastewater to the gypsum precipitation tank through the slurry pipeline VII for precipitation to obtain hydrated gypsum and supernatant wastewater, conveying the supernatant wastewater to the anaerobic biochemical pool through the slurry pipeline VIII for anaerobic nitrification treatment to obtain purified water and nitrogen gas, and conveying the purified water to the slurry mixing tank through slurry pipeline IX for slurry mixing, where ammonia vapor temperature at a gas outlet of the dephlegmator is 94 to 96° C., and mass percent content of ammonia in concentrated ammonia water is 8 to 10%.

Embodiment 4

Flue gas in this embodiment is copper refining flue gas, and the flue gas contains 2500 mg/m$^3$ of $SO_2$ and 400 mg/m$^3$ of NO.

Desulfurization components of red mud are $CaCO_3$: 30%, $3CaO.Al_2O_3SiO_2.4H_2O$ 28%, and $CaO.Al_2O_3.2SiO_2$ 10%. A method for desulfurization and denitrification integrated treatment and recycling of flue gas by using red mud is provided, where the system for desulfurization and denitrification integrated treatment and recycling of flue gas by using red mud is used, and specific steps of the method are as follows:

(1) adding red mud into the slurry mixing tank and conducting slurry mixing on the red mud and backwater obtained through biochemical treatment in the anaerobic biochemical pool to obtain red mud slurry, where solid-containing content of the red mud slurry is 13 to 15 wt. %, and a pH value of the red mud slurry is 5 to 5.5, and adding the red mud slurry into the denitration spray tower through the feed pump on the slurry pipeline III, where a supplement quantity of the red mud slurry in the denitration spray tower is 14 to 15 m$^3$/h, conveying the red mud slurry to the spray pipeline at a top end of the denitration spray tower through the circulation pump II on the circulation pipeline II, and conveying the red mud slurry to the bottom of the desulfurization spray tower through the slurry pipeline I;

(2) conveying the red mud slurry at the bottom of the desulfurization spray tower to the spray pipeline at a top end of the desulfurization spray tower through the circulation pump I on the circulation pipeline I, introducing flue gas into the desulfurization spray tower through the air blower for conducting gas-liquid countercurrent contact desulfurization treatment with the red mud slurry to obtain desulfurized flue gas and slurry A, conveying the slurry A to the spray pipeline at the top end of the desulfurization spray tower through the circulation pump I on the circulation pipeline I to replace the red mud slurry, and conveying the desulfurized flue gas to the denitration spray tower through the flue gas conveying pipeline I, where a liquid-gas volume ratio L:m$^3$ of the red mud slurry to the flue gas in the desulfurization spray tower is (10-11):1, the amount of flue gas of the desulfurization spray tower is 150000 m$^3$/h; and a circulation volume of the slurry A is 1500 to 1600 m$^3$/h;

(3) conveying ozone generated by the ozone generator to the flue gas conveying pipeline I through the ozone conveying pipeline and allowing the ozone to enter the denitration spray tower along with the desulfurized flue gas, conducting gas-liquid countercurrent contact denitrification treatment on the desulfurized flue gas, the ozone, and the red mud slurry to obtain desulfurized and denitrified flue gas and slurry B, conveying the slurry B to the spray pipeline at a top end of the denitration spray tower through the circulation pump II on the circulation pipeline II to replace the red mud slurry, conveying the slurry B to the bottom of the desulfurization spray tower through the slurry pipeline I to replace the red mud slurry, and emptying the desulfurized and denitrified flue gas, where a volume ratio of $O_3$ to NO in the denitration spray tower is 1:1, a liquid-gas volume ratio L:m$^3$ of the red mud slurry to the desulfurized flue gas is (10-11):1, and a circulation volume of the slurry B is 1500 to 1600 m$^3$/h;

(4) adding the slurry A obtained through circulation treatment in step (2) into the slurry storage tank through the slurry pipeline II, conveying the slurry in the slurry storage tank to the vacuum filter through the slurry pump on the slurry pipeline IV for solid-liquid separation, allowing liquid to enter the ammonia water neutralization tank through the liquid conveying pipeline I for conducting a neutralization reaction with ammonium water until slurry becomes neutral, allowing the slurry obtained after the reaction to enter the aluminum hydroxide precipitation tank through the liquid conveying pipeline II, adding a flocculant for sedimentation treatment to obtain underlayer aluminum hydroxide slurry and liquid supernatant, allowing the liquid supernatant to enter the ammonia water tank through the liquid conveying pipeline III, conveying the underlayer aluminum hydroxide slurry to the aluminum hydroxide storage tank through the aluminum hydroxide slurry conveying pipeline, conveying the aluminum hydroxide slurry in the aluminum hydroxide storage tank to the filter press through the screw filter pump for filter pressing to obtain alumina hydrate and filtrate, and conveying the filtrate to the ammonia water tank through the liquid conveying pipeline IV, where a pH value of a system in the ammonia water neutralization tank is 7 to 7.5; and (5) conveying slurry in the ammonia water tank to the dephlegmator through the ammonia pump on the liquid conveying pipeline V for heat exchange, adding the slurry to the ammonia distillation tower through the slurry pipeline IV for conducting a reaction with lime milk and vapor to obtain ammonia vapor and ammonia distillation wastewater, conveying the ammonia vapor to the dephlegmator through the flue gas conveying pipeline II for heat exchange to obtain concentrated ammonia gas, conveying the concentrated ammonia gas to the cooler through the flue gas conveying pipeline III for cooling treatment to obtain concentrated ammonia water, conveying the concentrated ammonia water to the concentrated ammonia water storage tank through the slurry pipeline V, conveying the concentrated ammonia water in the concentrated ammonia water storage tank to the ammonia water neutralization tank through the slurry pipeline VI for conducting an ammonia water neutralization reaction, conveying the ammonia distillation wastewater to the gypsum precipitation tank through the slurry pipeline VII for precipitation to obtain hydrated gypsum and supernatant wastewater, conveying the supernatant wastewater to the anaerobic biochemical pool through the slurry pipeline VIII for anaerobic nitrification treatment to obtain purified water and nitrogen gas, and conveying the purified water to the slurry mixing tank through slurry pipeline IX for slurry mixing, where ammonia vapor temperature at a gas outlet of the dephlegmator is 94 to 96° C., and mass percent content of ammonia in concentrated ammonia water is 8 to 10%.

The embodiments of the present invention are described in detail above with reference to the accompanying drawings, but the disclosure is not limited to the above embodiments. Within the knowledge of a person of ordinary skill in the art, various variations can also be made without departing from the spirit of the disclosure.

What is claimed is:

1. A system for desulfurization and denitrification integrated treatment and recycling of flue gas by using red mud, comprising a desulfurization spray tower, an ozone generator, a denitration spray tower, a slurry mixing tank, a slurry storage tank, a vacuum filter, an ammonia water neutralization tank, an aluminum hydroxide precipitation tank, an ammonia water tank, an aluminum hydroxide storage tank, a filter press, an ammonia distillation tower, a dephlegmator, a cooler, a concentrated ammonia water storage tank, a gypsum precipitation tank, and an anaerobic biochemical pool, wherein an air blower is arranged at a flue gas inlet end at the bottom of the desulfurization spray tower; a liquid outlet end at the bottom of the desulfurization spray tower is communicated with a spray nozzle communication pipeline at the top of the desulfurization spray tower through a circulation pipeline I; a circulating pump I is arranged on the circulation pipeline I; a flue gas outlet end at a top end of the desulfurization spray tower is communicated with a flue gas inlet end of the denitration spray tower through a flue gas conveying pipeline I; an ozone outlet end of the ozone generator is communicated with the flue gas conveying pipeline I through an ozone conveying pipeline; a liquid inlet at the bottom of the desulfurization spray tower is communicated with a liquid outlet at the bottom of the denitration spray tower through a slurry pipeline I; a liquid discharge port at the bottom of the desulfurization spray tower is communicated with a liquid inlet of the slurry storage tank through a slurry pipeline II; a liquid outlet of the slurry storage tank is communicated with a liquid inlet of the vacuum filter through a slurry pipeline IV; a slurry pump is arranged on the slurry pipeline IV; a liquid outlet of the vacuum filter is communicated with a liquid inlet of the ammonia water neutralization tank through a liquid conveying pipeline I; a liquid outlet of the ammonia water neutralization tank is communicated with a liquid inlet of the aluminum hydroxide precipitation tank through a liquid conveying pipeline II; a liquid outlet end at the top of the aluminum hydroxide precipitation tank is communicated with a liquid inlet of the ammonia water tank through a liquid conveying pipeline III; a slurry outlet at the bottom of the aluminum hydroxide precipitation tank is communicated with a feed port of the aluminum hydroxide storage tank through an aluminum hydroxide slurry conveying pipeline; the aluminum hydroxide storage tank is communicated with the filter press through a screw filter pump; a liquid outlet of the filter press is communicated with a liquid inlet of the ammonia water tank through a liquid conveying pipeline IV; a liquid outlet of the ammonia water tank is communicated with the dephlegmator through a liquid conveying pipeline V; an ammonia pump is arranged on the liquid conveying pipeline V; a liquid outlet of the dephlegmator is communicated with a liquid inlet at the top of the ammonia distillation tower through the slurry pipeline IV; a gas outlet at the top of the ammonia distillation tower is communicated with a gas inlet of the dephlegmator through a flue gas conveying pipeline II; a gas outlet of the dephlegmator is communicated with an air inlet end of the through a flue gas conveying pipeline III; the cooler is communicated with concentrated ammonia water through a slurry pipeline V; the concentrated ammonia water is communicated with the ammonia water neutralization tank through a slurry pipeline VI; a bottom part of the ammonia distillation tower is communicated with the gypsum precipitation tank through a slurry pipeline VII; an outlet of the gypsum precipitation tank is communicated with the anaerobic biochemical pool through a slurry pipeline VIII; and a slurry outlet of the anaerobic biochemical pool is communicated with a feed end of the slurry mixing tank through a slurry pipeline IX; and a liquid outlet end at the bottom of the denitration spray tower is communicated with a spray nozzle communication pipeline at the top of the denitration spray tower through a circulation pipeline II; a circulating pump II is arranged on the circulation pipeline II; a liquid inlet at the bottom of the denitration spray tower is communicated with a liquid discharge port of the slurry mixing tank through a slurry pipeline III; and a feed pump is arranged on the slurry pipeline III.

2. The system for desulfurization and denitrification integrated treatment and recycling of flue gas by using red mud according to claim 1, wherein each of the circulation pipeline I, the circulation pipeline II, the flue gas conveying pipeline I, the flue gas conveying pipeline II, the flue gas conveying pipeline III, the ozone conveying pipeline, the slurry pipeline I, the slurry pipeline II, the slurry pipeline III, the slurry pipeline IV, the slurry pipeline V, the slurry pipeline VI, the slurry pipeline VII, the slurry pipeline VIII, the slurry pipeline IX, the liquid conveying pipeline I, the liquid conveying pipeline II, the liquid conveying pipeline III, the liquid conveying pipeline IV, the liquid conveying pipeline V, and the aluminum hydroxide slurry conveying pipeline is provided with a valve.

3. A method for desulfurization and denitrification integrated treatment and recycling of flue gas by using red mud, wherein the system for desulfurization and denitrification integrated treatment and recycling of flue gas by using red mud according to claim 1 is used, and specific steps of the method are as follows:

(1) adding red mud into the slurry mixing tank and conducting slurry mixing on the red mud and backwater obtained through biochemical treatment in the anaerobic biochemical pool to obtain red mud slurry, and adding the red mud slurry into the denitration spray tower through the feed pump on the slurry pipeline III, conveying the red mud slurry to the spray pipeline at a top end of the denitration spray tower through the circulating pump II on the circulation pipeline II, and conveying the red mud slurry to the bottom of the desulfurization spray tower through the slurry pipeline I;

(2) conveying the red mud slurry at the bottom of the desulfurization spray tower to the spray pipeline at a top end of the desulfurization spray tower through the circulating pump I on the circulation pipeline I, introducing flue gas into the desulfurization spray tower through the air blower for conducting gas-liquid countercurrent contact desulfurization treatment with the red mud slurry to obtain desulfurized flue gas and slurry A, conveying the slurry A to the spray pipeline at the top end of the desulfurization spray tower through the circulating pump I on the circulation pipeline I to replace the red mud slurry, and conveying the desulfurized flue gas to the denitration spray tower through the flue gas conveying pipeline I;

(3) conveying ozone generated by the ozone generator to the flue gas conveying pipeline I through the ozone conveying pipeline and allowing the ozone to enter the denitration spray tower along with the desulfurized flue gas, conducting gas-liquid countercurrent contact denitrification treatment on the desulfurized flue gas, the ozone, and the red mud slurry to obtain desulfurized and denitrified flue gas and slurry B, conveying the slurry B to the spray pipeline at a top end of the denitration spray tower through the circulating pump II on the circulation pipeline II to replace the red mud slurry, conveying the slurry B to the bottom of the desulfurization spray tower through the slurry pipeline I to replace the red mud slurry, and emptying the desulfurized and denitrified flue gas;

(4) adding the slurry A obtained through circulation treatment in step (2) into the slurry storage tank through the slurry pipeline II, conveying the slurry in the slurry storage tank to the vacuum filter through the slurry pump on the slurry pipeline IV for solid-liquid separation, allowing liquid to enter the ammonia water neutralization tank through the liquid conveying pipeline I for conducting a neutralization reaction with ammonium water until slurry becomes neutral, allowing the slurry obtained after the reaction to enter the aluminum hydroxide precipitation tank through the liquid conveying pipeline II, adding a flocculant for sedimentation treatment to obtain underlayer aluminum hydroxide slurry and liquid supernatant, allowing the liquid supernatant to enter the ammonia water tank through the liquid conveying pipeline III, conveying the underlayer aluminum hydroxide slurry to the aluminum hydroxide storage tank through the aluminum hydroxide slurry conveying pipeline, conveying the aluminum hydroxide slurry in the aluminum hydroxide storage tank to the filter press through the screw filter pump for filter pressing to obtain alumina hydrate and filtrate, and conveying the filtrate to the ammonia water tank through the liquid conveying pipeline IV; and (5) conveying slurry in the ammonia water tank to the dephlegmator through the ammonia pump on the liquid conveying pipeline V for heat exchange, adding the slurry to the ammonia distillation tower through the slurry pipeline IV for conducting a reaction with lime milk and vapor to obtain ammonia vapor and ammonia distillation wastewater, conveying the ammonia vapor to the dephlegmator through the flue gas conveying pipeline II for heat exchange to obtain concentrated ammonia gas, conveying the concentrated ammonia gas to the cooler through the flue gas conveying pipeline III for cooling treatment to obtain concentrated ammonia water, conveying the concentrated ammonia water to the concentrated ammonia water storage tank through the slurry pipeline V, conveying the concentrated ammonia water in the concentrated ammonia water storage tank to the ammonia water neutralization tank through the slurry pipeline VI for conducting an ammonia water neutralization reaction, conveying the ammonia distillation wastewater to the gypsum precipitation tank through the slurry pipeline VII for precipitation to obtain hydrated gypsum and supernatant wastewater, conveying the supernatant wastewater to the anaerobic biochemical pool through the slurry pipeline VIII for anaerobic nitrification treatment to obtain purified water and nitrogen gas, and conveying the purified water to the slurry mixing tank through slurry pipeline IX for slurry mixing.

4. The method for desulfurization and denitrification integrated treatment and recycling of flue gas by using red mud according to claim 3, wherein solid-containing content of the red mud slurry in step (1) is 13 to 15 wt. %, and a pH value of the red mud slurry is 5 to 5.5.

5. The method for desulfurization and denitrification integrated treatment and recycling of flue gas by using red mud according to claim 3, wherein a liquid-gas volume ratio L:$m^3$ of the red mud slurry to the flue gas in the desulfurization spray tower in step (2) is (15-20):1.

6. The method for desulfurization and denitrification integrated treatment and recycling of flue gas by using red mud according to claim 3, wherein a volume ratio of $O_3$ to NO in the denitration spray tower in step (3) is 1:1, and a liquid-gas volume ratio L:$m^3$ of the red mud slurry to the desulfurized flue gas is (15-20):1.

7. The method for desulfurization and denitrification integrated treatment and recycling of flue gas by using red mud according to claim 3, wherein a pH value of a system in the ammonia water neutralization tank in step (4) is 7 to 7.5.

8. The method for desulfurization and denitrification integrated treatment and recycling of flue gas by using red mud according to claim 3, wherein ammonia vapor temperature at a gas outlet of the dephlegmator is 94 to 96° C., and mass percent content of ammonia in concentrated ammonia water is 8 to 10%.

* * * * *